ular to the
(12) United States Patent
Riecker et al.

(10) Patent No.: US 9,845,914 B2
(45) Date of Patent: Dec. 19, 2017

(54) NARROW GAP INSPECTION SYSTEM

(71) Applicant: Westinghouse Electric Germany GmbH, Mannheim (DE)

(72) Inventors: Alexander Riecker, Mannheim (DE); Christian Röllig, Heidelberg (DE); Jens Meissner, Mannheim (DE); Wolfgang Obierai, Einhausen (DE); Phetoury Souvannavong, Mannehim (DE)

(73) Assignee: WESTINGHOUSE ELECTRIC GERMANY GMBH, Mannheim (DE)

( * ) Notice: Subject to any disclaimer, the term of this patent is extended or adjusted under 35 U.S.C. 154(b) by 37 days.

(21) Appl. No.: 14/934,796

(22) Filed: Nov. 6, 2015

(65) Prior Publication Data

US 2016/0230923 A1 Aug. 11, 2016

(30) Foreign Application Priority Data

Nov. 8, 2014 (EP) .................................... 14003757

(51) Int. Cl.
*F16M 13/00* (2006.01)
*F22B 37/00* (2006.01)
(Continued)

(52) U.S. Cl.
CPC ........ *F16M 13/005* (2013.01); *F16M 13/022* (2013.01); *F22B 37/002* (2013.01); *G01D 11/30* (2013.01); *G01M 99/00* (2013.01)

(58) Field of Classification Search
USPC ........................................................ 248/542
See application file for complete search history.

(56) References Cited

U.S. PATENT DOCUMENTS 3,934,457 A * 1/1976 Clark ................... G01N 29/265
                                                    376/249
4,757,258 A * 7/1988 Kelly, Jr. .............. F22B 37/003
                                                    165/11.2
(Continued)

FOREIGN PATENT DOCUMENTS

EP 0297541 A1 1/1989
WO 2010058624 A1 5/2010

OTHER PUBLICATIONS

European Search Report dated Apr. 28, 2015, issued by the European Patent Office in corresponding European Patent Application No. EP 14 00 3757. (1 page).

*Primary Examiner* — Monica Millner
(74) *Attorney, Agent, or Firm* — Buchanan Ingersoll & Rooney PC

(57) ABSTRACT

The invention relates to a narrow gap inspection system, having a tube to be inspected, in particular a boiler tube, which extends in the axial direction and, surrounding this at a radial distance with a hollow-cylindrical gap, a casing, in particular a casing tube. The casing has an axially extending opening with an opening angle running perpendicular to the axial direction, and radially over the opening there is provided an axially mobile support system which supports a ring which is arranged in the gap and is able to rotate about the tube and has an inspection device that can be placed over the tube by means of a respective axial movement of the support system and a respective rotation of the ring in the gap. The invention also relates to a method for installing a narrow gap inspection system.

12 Claims, 4 Drawing Sheets

(51) Int. Cl.
*F16M 13/02* (2006.01)
*G01D 11/30* (2006.01)
*G01M 99/00* (2011.01)

(56) References Cited

U.S. PATENT DOCUMENTS

| | | | | |
|---|---|---|---|---|
| 4,848,278 | A * | 7/1989 | Theiss | F22B 37/483 |
| | | | | 122/383 |
| 4,879,973 | A * | 11/1989 | Maeyama | G01B 21/08 |
| | | | | 122/379 |
| 5,286,154 | A * | 2/1994 | Jens | B25J 18/06 |
| | | | | 294/100 |
| 5,568,527 | A * | 10/1996 | Richardson | G21C 17/003 |
| | | | | 376/210 |
| 5,782,209 | A * | 7/1998 | Vandenberg | F22B 37/483 |
| | | | | 122/379 |
| 5,982,839 | A * | 11/1999 | Hatley | G21C 17/017 |
| | | | | 376/245 |
| 6,434,207 | B1 * | 8/2002 | Mizumachi | G21C 17/017 |
| | | | | 376/245 |
| 6,904,817 | B2 * | 6/2005 | Davis | G21C 17/01 |
| | | | | 73/622 |
| 8,418,662 | B2 * | 4/2013 | Kim | F22B 37/003 |
| | | | | 122/363 |
| 2010/0011522 | A1 | 1/2010 | Kim et al. | |
| 2011/0169938 | A1 * | 7/2011 | Webster | F22B 37/002 |
| | | | | 348/82 |
| 2012/0257042 | A1 * | 10/2012 | McKaigue | G01N 21/954 |
| | | | | 348/84 |

* cited by examiner

NARROW GAP INSPECTION SYSTEM

The invention relates to a narrow gap inspection system, comprising a tube to be inspected, in particular a boiler tube, which extends in the axial direction and, surrounding this at a radial distance with a hollow-cylindrical gap, a casing, in particular a casing tube. The invention also relates to a method for installing a narrow gap inspection system.

It is generally known that boilers are used in nuclear reactor installations. In a special embodiment, a multiplicity of cylinder-like boilers is arranged radially around a nuclear reactor. In this context, each individual boiler is suspended with its individual components from a boiler tube located at its centre, what is referred to as a "boiler spine" which supports the entire weight of the boiler. Due to the high weight load, such a boiler tube has a wall thickness of approximately 30 mm-35 mm, wherein the tube diameter is greater than 500 mm. For thermal reasons, such a boiler tube is typically surrounded by a casing tube which surrounds the former with a gap spacing of approximately 8 mm to 15 mm and which performs a thermal protection function.

In order to ensure the greatest possible degree of safety, boiler tubes, in particular also their welded connections, should be inspected at regular intervals in order to be able to reliably exclude that material fatigue or any other damage to the respective boiler tube has occurred. In such an inspection, appropriate inspection devices are guided over the outside of the boiler tube, preferably in a grid pattern. Within the context of this invention, inspection devices are to be understood as any conceivable type of measurement probe such as ultrasound probes or the like, but also interactive tools which can for example be used to take samples from certain surface regions of the outer wall of a boiler tube. In order to move such inspection systems, it is known to use manipulators which can move on rail-like rings that must be mounted around the freely-accessible tube, around the radius of the latter.

A drawback in this context is that the accessibility of an installed boiler tube is greatly limited by the casing tube surrounding the former. The size of the gap between the boiler tube and the casing tube is for example only 10 mm, which precludes the use of conventional techniques to inspect a boiler tube surrounded by a casing tube. Removing the casing tube for the time period of an inspection is not practical on account of the high cost associated therewith.

Proceeding from this prior art, the invention has the object of providing a narrow gap inspection system which permits, even in the case of a very narrow gap, simple placement of an inspection device over an installed tube to be inspected, in particular a boiler tube, which is surrounded by a casing or a casing tube. The invention also has the object of indicating a method for installing a narrow gap inspection system.

The object is achieved with a narrow gap inspection system of the type mentioned in the introduction. This is characterized in that the casing has an axially extending opening with an opening angle running perpendicular to the axial direction, and in that radially over the opening there is provided an axially mobile support system which supports a ring which is arranged in the gap and is able to rotate about the tube to be inspected and has an inspection device that can be placed over the boiler tube by means of a respective axial movement of the support system and a respective rotation of the ring in the gap.

The basic idea of the invention is to place in the hollow-cylindrical gap a ring which supports an appropriate inspection system. The height of the inspection system and the thickness of the ring are to be chosen such that they do not exceed the size of the gap, for example 8 mm, wherein the axial length of a ring can for example be 250 mm. An axial movement of the ring along the axial extent of the opening, or a rotation of same, makes it possible to place an inspection device over the boiler tube to be inspected in a manner similar to a grid. An opening need not necessarily have one and the same opening angle over its entire axial length, this angle can vary widely as long as the accessibility for the support system is maintained.

All other components of the inspection system which are too large to be positioned in the gap are provided radially over an opening which is to be created in the casing or in the casing tube, which opening is for example 1.5 m long and has an opening angle of 90°. This relates in particular to the support system for the ring which can be moved axially together therewith and which is provided for the purpose of rotating the ring located in the gap. By creating an opening in the casing tube and arranging all of the bulky components radially over the opening, the support system makes it advantageously possible to move an inspection device within the gap even when a casing tube is present.

Preferably, the inspection device is provided for the purpose of inspecting the outer surface of the radially inner tube, although the inspection system can of course also be used to inspect the inner surface of the radially outer casing. The radially outer casing can be a thermal protection tube which surrounds the tube to be inspected. However, a casing can also be any other wall which also need not enclose the tube to be inspected over its entire circumference. What is important is that the tube to be inspected is surrounded over its entire circumference by a hollow-cylindrical gap or a free space or narrow gap, so as to permit the use of the inspection system according to the invention. The invention is thus suitable for inspecting a great number of types of tube surrounded by a hollow-cylindrical gap or narrow gap, specifically as encountered in many instances in nuclear installations.

According to one particular configuration of the inventive narrow gap inspection system, the inspection device is connected to the ring via a flat connecting element extending axially in the gap, and the inspection device can thereby also be placed in axial gap regions along which the opening does not extend. The use of such a strut advantageously extends the axial range of the narrow gap inspection system which, without a connecting element or strut, would be limited to approximately the axial length of the opening. With both the strut and the opening having a length of 1.5 m, mounting the strut first on one side of the ring and then on the other side of the ring makes it possible to cover a total axial inspection length of approximately 4.5 m. The connection lines required for the inspection device, which can vary depending on the type of inspection device, are to be provided in or on the strut. For that reason, the inspection device and the strut ideally form one unit which can be exchanged for another unit, for example if a different probe is required.

According to a further configuration of the inventive narrow gap inspection system, at the ring-side end of the flat connecting element there is provided a ribbon cable introduced perpendicular to the axial direction into the opening, which cable has connection lines for the inspection device. Using a flat cable prevents the lines from twisting during a rotational movement of the ring; rather, during a rotational movement the ribbon cable is wound as onto a roll, for example into a corresponding circumferential recess of the ring.

According to a further variant of the invention, the axial length of the flat connecting element does not exceed the axial length of the opening and the connecting element can be inserted in axial orientation through the opening into the gap. This advantageously simplifies the installation of a narrow gap inspection system on a boiler tube surrounded by a casing tube.

In a further variant of the inventive narrow gap inspection system, the ring consists of multiple circle-connected ring segments, wherein the size of the arc of a respective ring segment is chosen such that this segment can be introduced into the gap through the opening when oriented transversely to the axial direction. Using multiple ring segments, for example 5 or 6, makes it possible to introduce a ring, enclosing the boiler tube, piece by piece into the gap. The ring segments, which are for example made of stainless steel or aluminium, can be rigidly connected to one another by means of a respective bolt connection or hinge connection.

In one preferred configuration of the inventive narrow gap inspection system, the support system has a drive device for axial movement. This drive device can, for its part, have a motor and driven rollers or pinions which for example engage with a corresponding toothed rack. This advantageously simplifies automated inspection.

According to a particularly preferred variant of the narrow gap inspection system, the support system has a drive device for rotating the ring. This ideally contains simultaneously a guide device for the ring, such that the ring is mounted so as to be able to rotate relative to the support system, for example a respective plain bearing which encloses the ring at its lateral cross section edges. This also advantageously simplifies automated inspection.

According to a further embodiment of the narrow gap inspection system, the ring has at least one circumferential row of evenly spaced engagement holes by means of which a rotation of the drive device can be transmitted to the ring in order to rotate the latter. In this context, the circumferential row of engagement holes acts as a toothed rack in which engages a pinion of the corresponding drive device arranged in the support system. Instead of engagement holes, engagement cleats are also conceivable. The rotational movement can also be transmitted by means of static friction, for example by means of a rubber wheel.

According to a further variant of the inventive narrow gap inspection system, there is provided at least one axial guide rail connected to the casing tube, on which rail the support system, together with the ring, can be made to move. Such guide rails can for example be temporarily welded or screwed onto the casing tube. Here, too, the use of a toothed rack is advantageous as this prevents the drive from slipping and makes it possible to position the support system, with the ring borne thereby, with great precision. Ideally, the support system forms with the guide rails a prefabricated unit which is then connected to the casing at at least one end of the guide rails. This advantageously simplifies assembly.

According to a particularly preferred variant of the invention, the ring can be rotated through at least 360°. This makes it easy to scan the entire circumference of the boiler tube.

According to a particularly preferred configuration of the inventive narrow gap inspection system, the system has a control device which can coordinate an axial movement of the support system with a rotation of the ring. A control device can for example be a computation device with screen output device and operating panel, which also allows interaction with the inspection device.

The object according to the invention is also achieved with a method for installing a narrow gap inspection system, with a boiler tube to be inspected, which extends in the axial direction and, surrounding this at a radial distance with a hollow-cylindrical gap, a casing tube. This comprises the following steps:

providing, in the casing tube, an opening extending axially with an opening angle running transversely to the axial direction, sequential insertion and circular connection of multiple ring segments to give a rotatable ring in the gap, connecting, to the casing tube, a guide rail extending along the opening, providing a support system for the ring, which system is able to move on the guide rail and by means of which the ring can be moved axially and rotated in the gap along the opening, connecting an inspection device to the ring.

The corresponding advantages of the inspection system installed thereby have already been explained. Upon completion of the inspection, the narrow gap inspection system must once again be dismantled and the opening in the casing tube must be closed again, for example by welding on the previously removed tube casing section.

Further advantageous configuration possibilities can be found in the further dependent claims.

The invention, further embodiments and further advantages will be described in more detail with reference to the exemplary embodiments shown in the drawings, in which.

Figure 1:
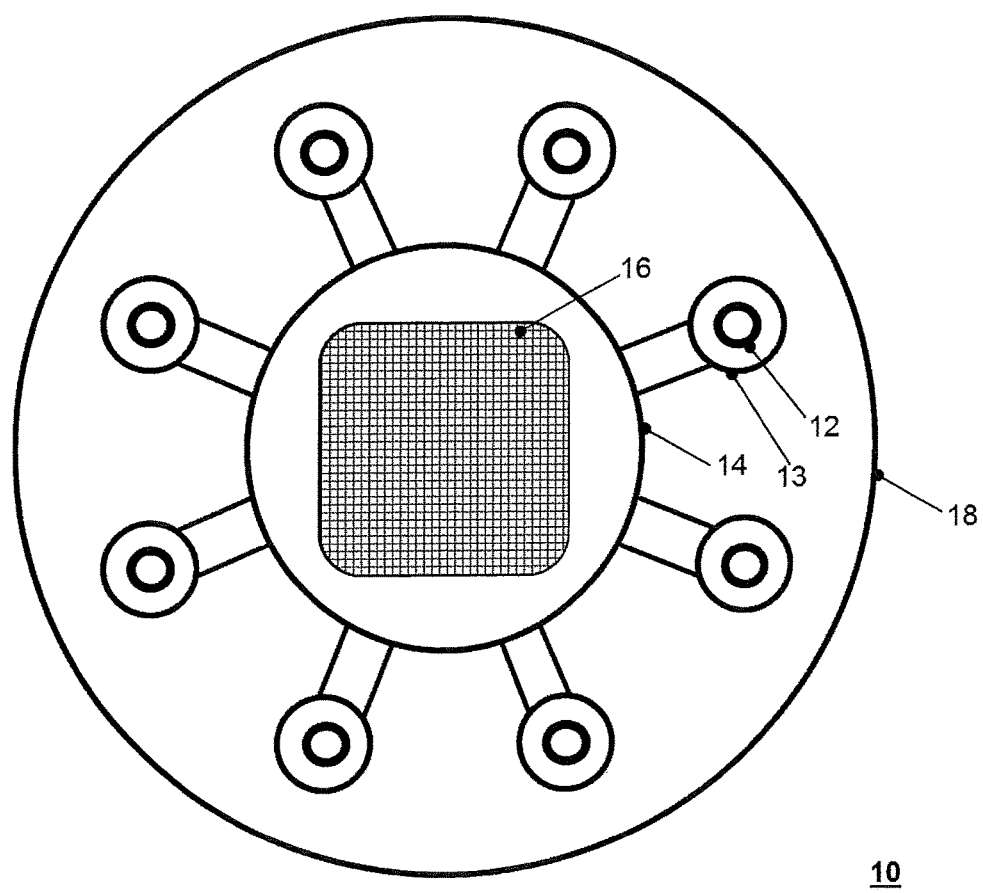
FIG. 1 shows an exemplary nuclear reactor with boiler tubes.

FIG. 1 shows, in a schematic plan view 10, an exemplary nuclear reactor 16 which is arranged in a reactor vessel 14. The reactor vessel 14 is surrounded radially by multiple boilers 13, in the centre of each of which there is a boiler tube 12 or a "boiler spine". During operation, heated coolant flowing out of the reactor vessel 14 is continuously fed into the boilers 13, in which there are arranged heat exchangers that cool the coolant and generate steam. The steam is subsequently used to generate electrical power. The cooled coolant is then fed back into the reactor vessel 14. In order to improve thermal insulation, the boiler tubes 12 are each surrounded by an insulation tube arranged with a narrow gap separation of approximately 8 mm-15 mm.

Figure 2:
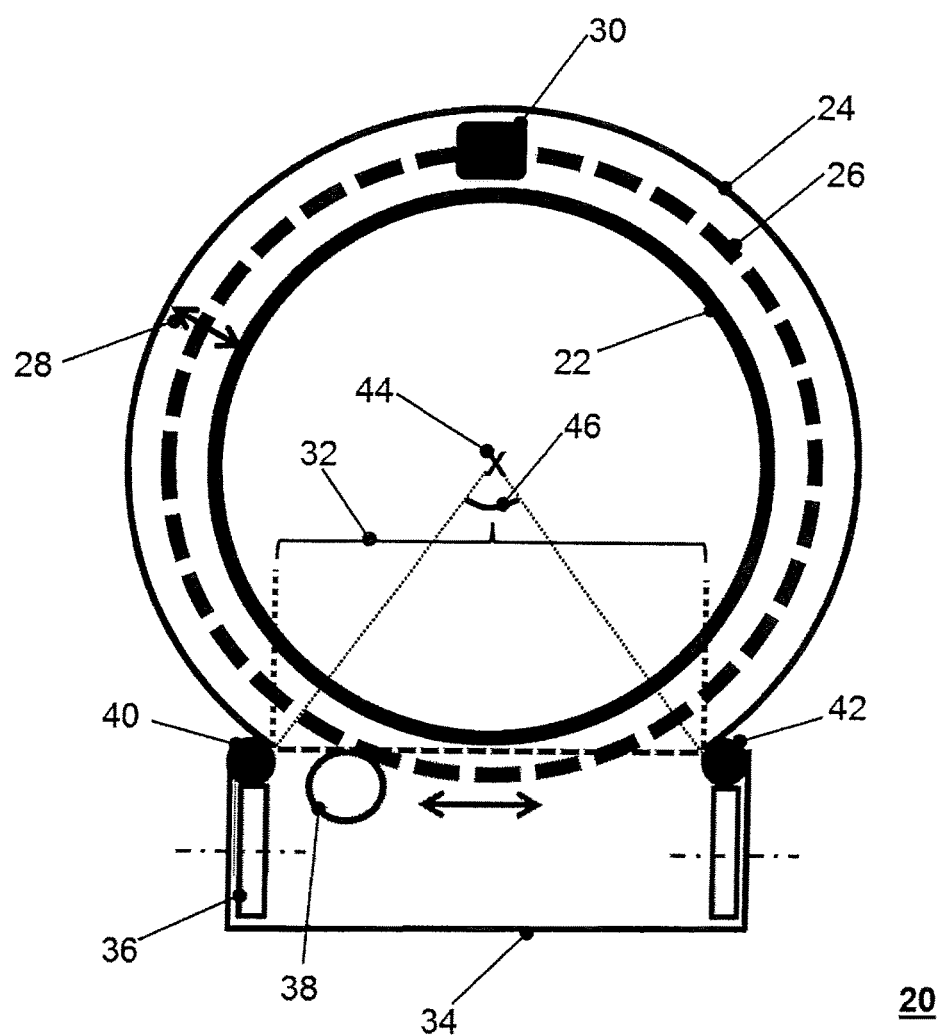
FIG. 2 shows a first exemplary boiler inspection system.

FIG. 2 shows a first exemplary boiler inspection system 20 in a schematic section view. A boiler tube 22, which has an exemplary internal diameter of 500 mm and a wall thickness of 30 mm-35 mm, extends along an imaginary central axis 44. The boiler tube 22 is surrounded by a casing tube 24 which is provided for thermal insulation. An approximately 12 mm-wide hollow-cylindrical gap 28, within which a ring 26 is arranged so as to be able to rotate freely, extends between the radial outer surface of the boiler tube 22 and the radial inner surface of the casing tube 24.

The ring 26 has a thickness of approximately 8 mm and an axial length of for example 300 mm and is composed of multiple rigid segments. In its upper region, the ring 26 is connected to an inspection device 30 which is able to rotate in the gap 28 together with the ring 26. The inspection device 30 also has a radial thickness, of 10 mm, and is in this case an ultrasound probe, it also being possible to use any other suitable inspection device such as for example a camera or a tool for taking samples of the tube material, depending on the type of tube inspection that is to be carried out.

The casing tube 24 has an opening 32 which is provided for the purpose of carrying out an inspection and which is characterized by an axial length and an opening angle 46. An axially movable support system 34, which has a rotary bearing for the ring 26 and thus supports the latter exactly in the gap 28, is located radially above the opening 32. A drive device 38 is provided in order to rotate the ring 26 into any angular position within a range of at least 360°. In this case, the ring has two rows (not shown) of circumferential holes into each of which a respective pinion of the drive device 38 engages.

For its part, the support system 34 is arranged on axial guide rails 40, 42 which are formed similar to a toothed rack and on which the support system can move axially together with the ring 26. To that end, there is provided a drive device 36 which is operatively connected to the guide rails 40, 42 via a respective pinion.

Figure 3:
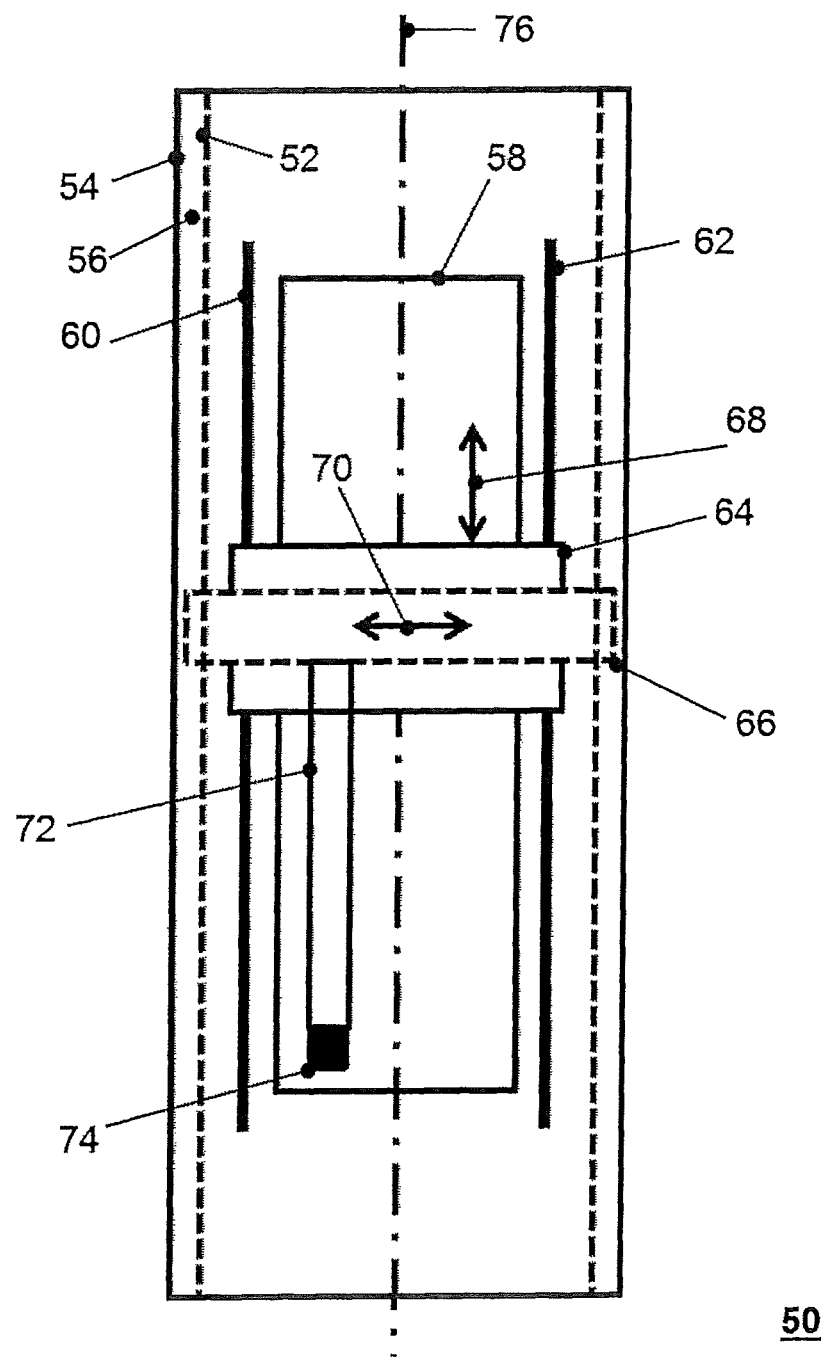
FIG. 3 shows a second exemplary boiler inspection system.

FIG. 3 shows a second exemplary boiler inspection system 50 in schematic plan view. A boiler tube 52—indicated by means of respective dashed lines because it is not actually visible from this perspective—extends around an imaginary central axis 76. Radially outwards, there is an adjoining hollow-cylindrical gap and a casing tube 54. The casing tube has, in an axial region of approximately 1.8 m, an opening 58 with an opening angle of approximately 60°. Depending on the number of segments of a ring, a different opening angle may also prove to be expedient.

Axial guide rails 60, 62 are arranged on both sides parallel to the opening 58, which rails, just like the opening 58, are provided only temporarily for the purpose of carrying out an inspection. A support system 64 is provided so as to be able to move axially 68 on the guide rails 60, 62, which support system carries, arranged in the gap 56, a ring 66 that can be rotated 70 by means of a drive device (not shown).

An inspection device 74 is connected to the ring 66, axially separated from the latter, by means of a flat rod-like connecting element 72 which is also located in the gap 56. It is thus possible, by means of an appropriate axial movement 68 of the ring 66 and/or of the support system 64 supporting the latter, to move the inspection device 74 even into a gap region along which the opening 58 does not extend.

Figure 4:
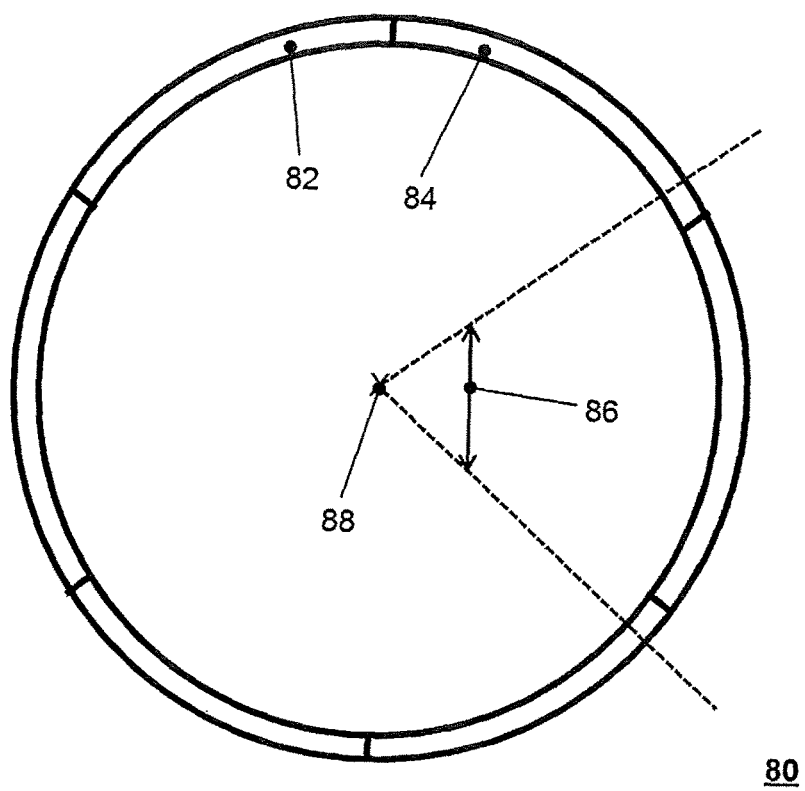
FIG. 4 shows a segmented ring.

FIG. 4 shows, in a schematic plan view, a segmented ring 80 consisting of multiple ring segments 82, 84 which are connected to one another in the form of a circle and are arranged around an imaginary central axis 88. In this case, the number of ring segments 82, is 6 such that each ring segment encloses an arc angle of 60°. An opening angle 86 of an opening in a casing tube (not shown) is indicated with dashed lines and amounts to 75°. It is thus simple to introduce each individual ring segment 82, 84 through the opening into a gap (not shown) and there to connect it to give the ring 80.

LIST OF REFERENCE SIGNS 10 exemplary nuclear reactor with boiler tubes
12 boiler tube surrounded by casing tube
13 boiler
14 reactor vessel
16 nuclear reactor
18 protective wall
20 first exemplary boiler inspection system
22 boiler tube
24 casing tube
26 rotatable ring
28 hollow-cylindrical gap
30 inspection device
32 opening in casing tube
34 support system
36 drive device for axial movement
38 drive device for rotation
40 first axial guide rail
42 second axial guide rail
44 central axis
46 opening angle
50 second exemplary boiler inspection system
52 boiler tube
54 casing tube
56 hollow-cylindrical gap
58 opening in casing tube
60 first axial guide rail
62 second axial guide rail
64 support system
66 rotatable ring
68 axial direction of movement
70 direction of rotation
72 flat connecting element
74 inspection device
76 central axis
80 segmented ring
82 first ring segment
84 second ring segment
86 opening angle
88 central axis

The invention claimed is:

1. Narrow gap inspection system having a tube to be inspected, which extends in an axial direction along a central axis of the tube, the system comprising:
   a casing for surrounding the tube at a radial distance with a hollow-cylindrical gap, wherein the casing has an axially extending opening with an opening angle running perpendicular to the axial direction; and
   radially over the axially extending opening there is provided an axially mobile support system which supports a ring which is arranged in the gap for rotation about the tube and having an inspection device configured for placement over the tube by movement in the axial direction of the axially mobile support system and a rotation of the ring in the gap about the central axis of the tube.

2. Narrow gap inspection system according to claim 1, wherein the inspection device is connected to the ring via a flat connecting element extending axially in the gap, and the inspection device being configured for placement in axial gap regions, wherein the opening does not extend to the axial gap regions.

3. Narrow gap inspection system according to claim 2, wherein at a ring-side end of the flat connecting element there is provided a ribbon cable introduced perpendicular to the axial direction into the opening, which cable has connection lines for the inspection device.

4. Narrow gap inspection system according to claim 2, wherein the axial length of the flat connecting element does not exceed an axial length of the opening, and the connecting element is configured for insertion in an axial orientation through the opening into the gap.

5. Narrow gap inspection system according to claim 1, wherein the ring consists of multiple circle-connected ring segments, wherein a size of an arc of a respective ring segment is configured such that this segment can be introduced into the gap through the opening when oriented transversely to the axial direction.

6. Narrow gap inspection system according to claim 1, wherein the support system has a drive device for axial movement.

7. Narrow gap inspection system according to claim 1, wherein the support system has a drive device for rotating the ring.

8. Narrow gap inspection system according to claim 7, wherein the ring has at least one circumferential row of evenly spaced engagement holes by which a rotation of the drive device can be transmitted to the ring in order to rotate the ring.

9. Narrow gap inspection system according to claim 1, comprising:
- at least one axial guide rail connected to the casing, on which rail the support system, together with the ring is configured to move.

10. Narrow gap inspection system according to claim 1, wherein the ring is configured for rotation through at least 360° about the central axis of the tube.

11. Narrow gap inspection system according to claim 1, comprising:
- a control device to coordinate an axial movement of the axially mobile support system with a rotation of the ring.

12. Method for installing a narrow gap inspection system, with a tube to be inspected which extends in an axial direction along a central axis and a casing surrounding the tube at a radial distance with a hollow-cylindrical gap, the method comprising:
- providing, in the casing, an opening extending axially with an opening angle running transversely to the axial direction;
- sequentially inserting and circularly connecting multiple ring segments to give a rotatable ring in the gap;
- connecting, to the casing, a guide rail extending along the opening;
- providing a support system for the ring, which system is moved on the guide rail by which the ring is moved axially and rotated in the gap along the opening; and
- connecting an inspection device to the ring.

* * * * *